United States Patent
Munson et al.

[11] Patent Number: 6,145,194
[45] Date of Patent: Nov. 14, 2000

[54] METHOD FOR REPAIRING A SHRINK-FITTED TURBINE DISC

[75] Inventors: Ronald E. Munson, Round Rock, Tex.; Shane Joseph Findlan, Harrisburg; David W. Gandy, Concord, both of N.C.; Ramaswamy Viswanathan, Saratoga, Calif.

[73] Assignee: Electric Power Research Institute, Inc., Palo Alto, Calif.

[21] Appl. No.: 09/321,703

[22] Filed: May 28, 1999

[51] Int. Cl.⁷ ........................................ B23P 15/00
[52] U.S. Cl. ........................................ 29/889.1; 29/889.7
[58] Field of Search ............................... 29/889.1, 889.7, 29/402.09, 402.13, 447; 228/119

[56] References Cited

U.S. PATENT DOCUMENTS

| | | | |
|---|---|---|---|
| 5,839,643 | 11/1998 | Inoue et al. | 29/889.1 |
| 5,945,013 | 8/1999 | LaFave | 219/137 PS |
| 6,049,979 | 4/2000 | Nolan et al. | 228/119 |

*Primary Examiner*—Irene Cuda
*Attorney, Agent, or Firm*—William S. Galliani; Pennie & Edmonds LLP

[57] ABSTRACT

A method for repairing a shrink-fitted turbine disc without removing the disc from the shaft. The method is composed of two basic steps: (1) depositing one or more weld layers in a vicinity of a defective region of the disc using a temperbead welding process and (2) heat treating the disc using an induction heating process. In a first embodiment of the method, the heat treating step includes heating a heat-affected zone of the disc in a vicinity of the one or more weld layers to a temperature $T_h$, heating a rim region of the disc to a temperature $T_r$ and heating a bore region of the disc to a temperature $T_b$, where $T_h$, $T_r > T_b$. In a second embodiment of the method, the heat treating step includes heating a region of the disc in a vicinity of the one or more weld layers using the induction heating process and concurrently cooling a bore region of the disc. In a third embodiment of the method, the heat treating step includes heating at least a portion of the disc using the induction heating process and concurrently heating the shaft to maintain a predetermined temperature differential between the bore region of the disc and the shaft. In a fourth embodiment of the method, the heat treating step includes heating at least a portion of the disc using the induction heating process and concurrently heating the shaft to maintain a uniform temperature between the bore region of the disc and the shaft.

16 Claims, 4 Drawing Sheets

METHOD FOR REPAIRING A SHRINK-FITTED TURBINE DISC

BRIEF DESCRIPTION OF THE INVENTION

The present invention relates generally to the repair of turbine rotors. More particularly, the present invention relates to a method for repairing a shrink-fitted turbine disc without removing the disc from the shaft.

BACKGROUND OF THE INVENTION

FIG. 1 is a diagrammatic view of a conventional steam turbine rotor assembly 100 including a disc 102 and a shaft 104. For simplicity, the rotor assembly 100 includes only a single disc and the blades are not shown. The disc 102 includes a rim region 106, a web region 107, and a bore region 108. The disc 102 may be a shrink-fitted disc, which is a disc that is specially processed to provide compressive bore/shaft forces that bind the disc to the shaft.

A defective region 110, for example, a crack, is shown on the disc 102. The defective region 110 may be caused by several failure mechanisms, such as stress corrosion cracking, which occur during the operation of the rotor assembly 100 in a turbine. In a conventional mono-block rotor repair welding technique, the disc is repaired by arc welding the defective region 110 to form a weld 112. During the welding process, a heat-affected zone (HAZ) 114 is formed in a region of the disc that is metallurgically affected by the heat generated by the welding. Next, the disc undergoes a post-weld heat treatment (PWHT) to temper and stress-relieve the HAZ 114 and secondarily, the weld 112. During PWHT, the repaired disc is heated, typically using resistance heating.

The conventional repair technique just described, however, is not very suitable for repairing shrink-fitted discs. Shrink-fitted discs must first be removed from the shaft before the repairs are performed and then refitted onto the shaft after the repairs are completed. The disc must be removed from the shaft to prevent the PWHT from relaxing the disc's shrink-fitted forces that hold the disc on the shaft. In addition, the disc must be removed to prevent the PWHT from overheating the shaft and thus causing it to bow. Due to the difficulties and time required to remove and refit shrink-fitted discs, it has not been considered cost-effective to repair damaged shrink-fitted discs. As a result, defective shrink-fitted discs have been discarded rather than repaired—a rather expensive procedure.

In view of the shortcomings of conventional repair techniques, it is an object of the present invention to provide a method for repairing a shrink-fitted turbine disc without removing the disc from the shaft.

SUMMARY OF THE INVENTION

The present invention is a method for repairing a shrink-fitted turbine disc without removing the disc from the shaft. The method is composed of two basic steps: (1) depositing multiple weld layers in a vicinity of a defective region of the disc using a temperbead welding process and (2) heat treating the disc using an induction heating process. The steps are performed with the disc on the shaft.

In a first embodiment of the method, the heat treating step includes heating the deposited weld metal and heat-affected zone of the disc in a vicinity of the weld layers to a temperature $T_h$, heating a rim region of the disc to a temperature $T_r$, and heating a bore region of the disc to a temperature $T_b$, where $T_h$, $T_r > T_b$ (i.e., $T_{h>Tr} > T_b$ or $T_h = T_r > T_b$).

In a second embodiment of the method, the heat treating step includes heating a heat-affected zone of the disc in a vicinity of the one or more weld layers using the induction heating process and concurrently cooling the bore region of the disc.

In a third embodiment of the method, the heat treating step includes heating at least a region of the disc using the induction heating process and concurrently heating the shaft to maintain a predetermined temperature differential between the bore region of the disc and the shaft.

In a fourth embodiment of the method, the heat treating step includes heating at least a portion of the disc using the induction heating process and concurrently heating the shaft to maintain a uniform temperature between the bore region of the disc and the shaft.

The combined use of the temperbead welding and induction heating processes allows the disc to be adequately heat treated while preventing the relaxation of the disc's shrink-fitted forces and the bowing of the shaft. As a result, the present invention allows a disc to be repaired without removing the disc from the shaft.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
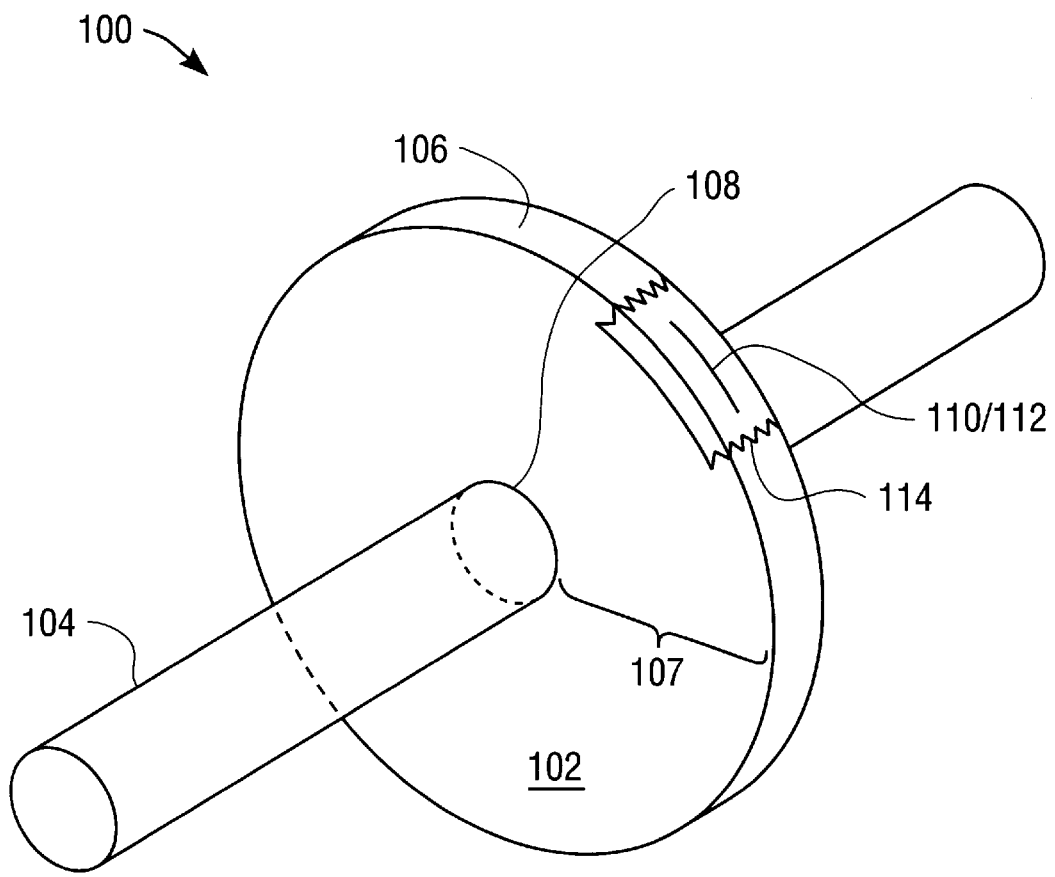
FIG. 1 is a diagrammatic view of a conventional steam turbine rotor assembly, including a disc and a shaft.
Figure 2A:
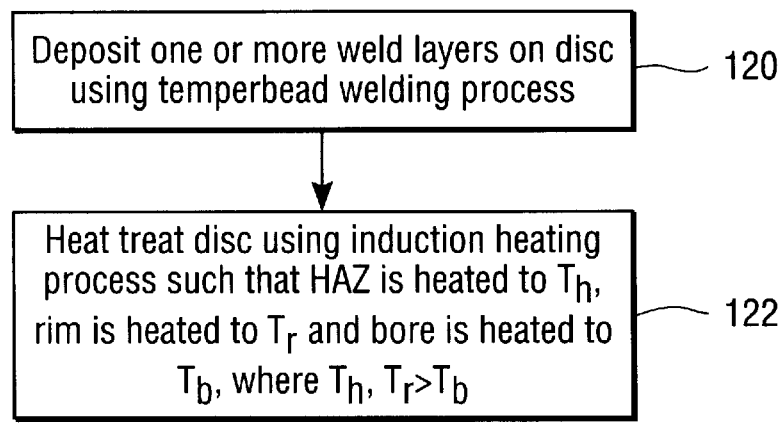
FIGS. 2(a), 2(b) and 2(c) are flow charts showing the steps of three embodiments of a method for repairing a shrink-fitted turbine disc in accordance with the present invention.
Figure 2B:
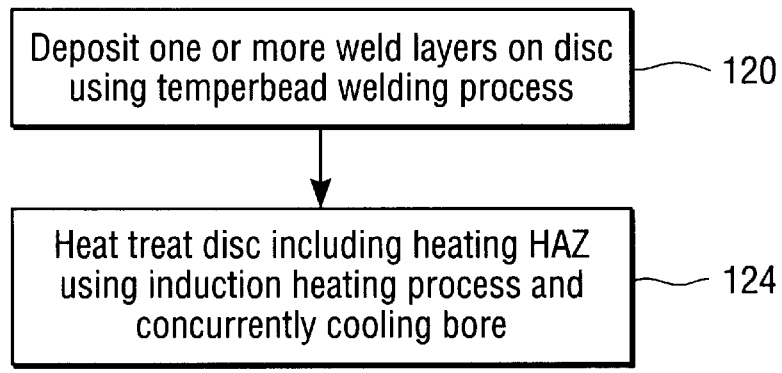
Figure 2C:
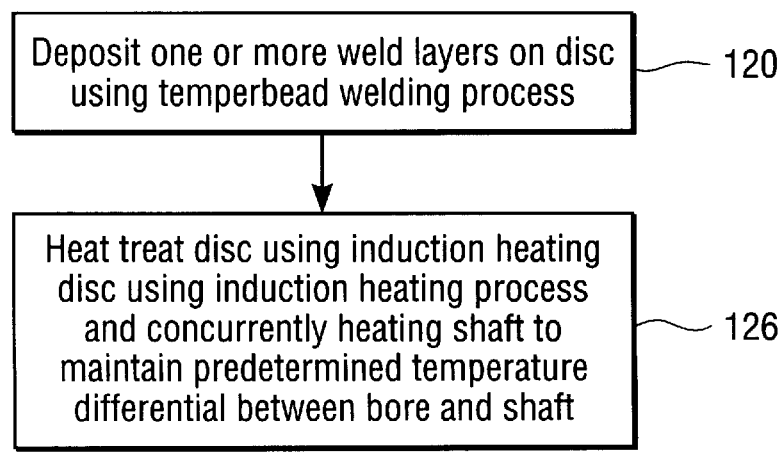

FIGS. 2(a), 2(b) and 2(c) show the steps of three embodiments of a method for repairing a shrink-fitted disc in accordance with the present invention. The method repairs the shrink-fitted disc 102 without removing the disc from the shaft 104. The shrink-fitted disc 102 may be made of a material having a relatively high tensile strength of about 140,000 pounds per square-inch (140 ksi) or more, such as high-strength steel. In all three embodiments of the method, the repair process comprises two basic steps: (1) depositing one or more weld layers near the defective region 110 of the disc using a temperbead welding process and (2) heat treating the disc using an induction heating process. The three embodiments of the method differ in the details of the heat treating step.

FIG. 2(*a*) shows the steps of a first embodiment of the method for repairing the shrink-fitted disc 102. First, one or more weld layers are deposited near the defective region 110 of the disc using a temperbead welding process (step 120). The temperbead welding process used by the present invention involves depositing successive weld layers formed with a series of overlapping weld beads on the disc to develop adequate toughness properties within both the HAZ 114 and the weld layers. The temperbead welding process obtains these properties by tempering the original microstructure of the disc material and by providing grain refinement. The bead-to-bead overlap is approximately 50% of the bead width of the successive weld layers.

The temperbead welding process of the present invention only partially tempers the HAZ and weld layers of the disc and is thus followed by a heat treatment process to complete the tempering process. The inventors have found that the temperbead welding process reduces the tempering required during the heat treatment process, thereby minimizing the relaxation of the shrink-fitted forces in the disc during heat treatment. In one embodiment, the weld beads 116 and 118 are overlapped by approximately 50% of their width, providing a layer thickness of about 1 to 4 mm.

The weld layers 116 and 118 are deposited by melting weld filler wire using either gas-tungsten arc welding (GTAW), submerged arc welding (SAW), or laser welding techniques. The inventors have found that GTAW is suitable for use with the temperbead welding process because of its ability to place weld layers in precise relation to previously deposited material. Laser welding was found by the inventors to be suitable for use with this process because it produces a small, narrow HAZ 114, thereby minimizing the volume of material that must be tempered by subsequent welding passes. In addition, laser welding produces a metallurgically superior weld with a finer grained structure than that provided by other welding techniques. The weld filler wire used for the temperbead welding process is composed of a relatively high tensile strength (up to about 140 ksi) metal. A high tensile strength weld filler wire is used so that the deposited weld layers are comparable in tensile strength to the shrink-fitted disc.

Figure 3:
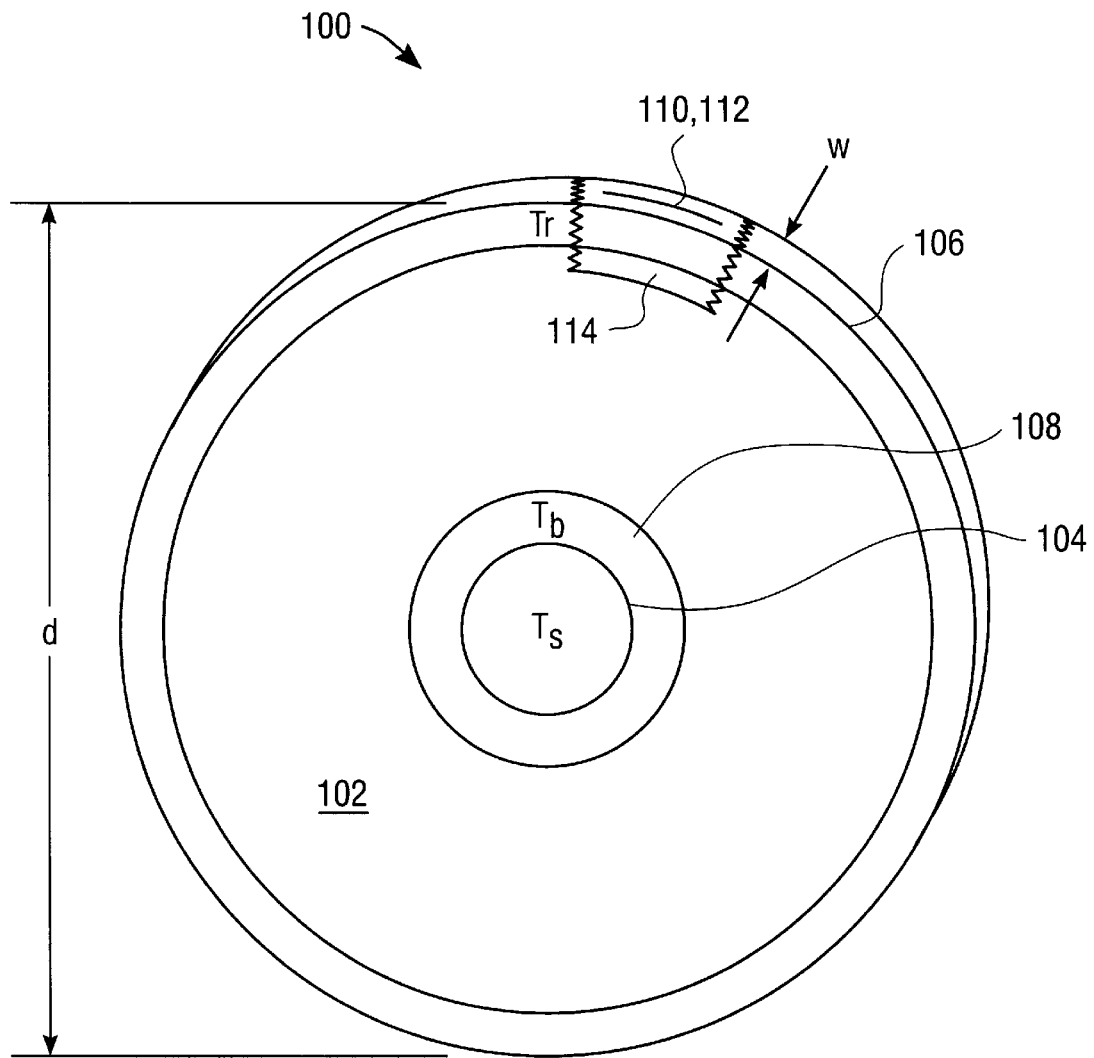
FIG. 3 is a diagrammatic view of a disc illustrating the temperature of various regions of the disc during the heat treatment step of the present invention.

Returning to FIG. 2(*a*), the second step of this method is to heat treat the disc 102 using an induction heating process (step 122). In particular, the HAZ 114 is heated to a temperature $T_h$, the rim region 106 is heated to a temperature $T_r$ and the bore region 108 is heated to a temperature $T_b$, where $T_h$, $T_r > T_b$ (i.e., $T_h > T_r > T_b$ or $T_h = T_r > T_b$). Induction heating, which is described in greater detail below, produces a highly localized heating pattern in which the temperature of various regions of the disc may be precisely controlled. FIG. 3 shows the temperatures of the HAZ 114, rim 106 and bore 108 regions of the disc 102 during the heat treating step. The inventors have found that concentrating the heat at the outer regions of the disc (e.g., the HAZ 114 and the rim region 106) allows the disc to be adequately heat treated without relaxing the disc's shrink-fit forces or bowing the shaft. In one embodiment, the rim temperature $T_r$ is less than the disc-tempering temperature of the disc, i.e., the temperature at which the disc is tempered during manufacture. In this embodiment, the bore temperature $T_b$ is less than the shrink-fit temperature of the disc, i.e., the temperature at which the disc is shrink-fit onto the shaft. For example, the rim temperature $T_r$ is about 100 degrees Fahrenheit (° F.) below the disc-tempering temperature and the bore temperature $T_b$ is about 50 to 100° F. below the shrink-fit temperature. Typical disc-tempering temperatures are up to about 1350° F. while typical shrink-fit temperatures range from about 400 to 500° F., depending on the disc's manufacturer. Therefore, for example, the rim temperature $T_r$ may be about 1250° F. and the bore temperature $T_b$ may be up to about 300° F. The temperature of the disc 102 varies approximately linearly across a diameter d of the disc, although other rates of temperature variation may also be used.

FIG. 2(*b*) shows the steps of a second embodiment of the method for repairing the shrink-fitted disc 102 in accordance with the present invention. First, deposit one or more weld layers near the defective region 110 of the disc using the temperbead welding process (step 120). This step is identical to the first step of the first embodiment of FIG. 2(*a*). Second, heat treat the disc 102 by heating the HAZ 114 using an induction heating process and concurrently cooling the bore region 108 to limit the heat build-up there (step 124).

The inventors have found that concurrently heating the HAZ and cooling the bore region in this manner during heat treatment allows the disc to be adequately heat treated without relaxing the disc's shrink-fit forces or bowing the shaft. During the heat treating step 124, a predetermined temperature differential is maintained between the bore region 108 and the shaft 104, $T_b-T_s$, where $T_b$ and $T_s$, are the temperatures of the bore region and shaft, respectively. The level of interference fit and thus the shrink fit forces are based on a predetermined temperature differential that is related to the original diameter of the disc bore and the shaft diameter.

FIG. 2(*c*) shows the steps of a third embodiment of the method of the invention. First, deposit one or more weld layers near the defective region 110 of the disc using the temperbead welding process (step 120). Second, heat treat the disc 102 by heating at least a portion of the disc using an induction heating process and concurrently heating the shaft 104 to maintain a predetermined temperature differential between the bore region 108 of the disc and the shaft 104, $T_b-T_s$, where $T_b$ and $T_s$, are the temperatures of the bore region and shaft, respectively (step 126). The inventors have found that concurrently heating the disc and shaft to maintain this predetermined temperature differential during heat treatment allows the disc to be adequately heat treated without relaxing the disc's shrink-fit forces or bowing the shaft. Preferably, the positive difference in temperature between the bore and the shaft is limited to a predetermined temperature. A negative difference, that is, where the shaft is warmer than the disc bore is acceptable. Successful results have been achieved by heating the disc rim and weld HAZ region and heating the shaft to maintain the shaft at a temperature approximately equal to the bore temperature.

Figure 4:
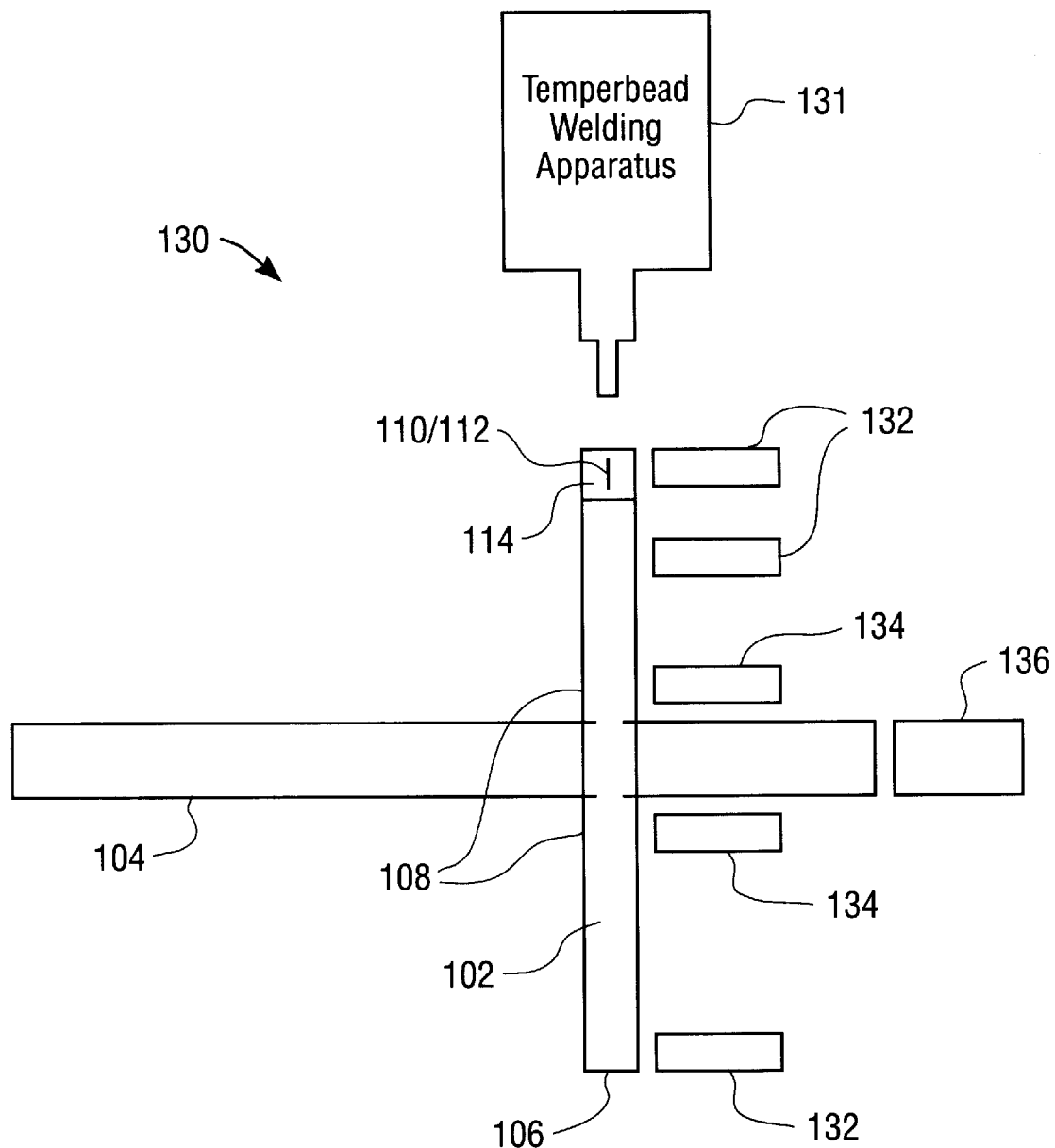
FIG. 4 is a diagrammatic view of an apparatus for performing the method of the present invention, including a temperbead welding apparatus, an induction heating apparatus, a cooling apparatus and a shaft heating apparatus.

FIG. 4 shows an apparatus 130 for performing the repair method of the present invention. The apparatus 130 repairs the shrink-fitted turbine disc 102 without removing the disc from the shaft 104 and may be used to perform the repair method described above. The repair apparatus 130 includes a temperbead welding apparatus 131 for depositing a plurality of weld layers near the defective region 110 of the disc 102. The temperbead welding apparatus 131 preferably includes a GTAW, SAW, or a laser welding apparatus, although other welding apparatus may also be used.

The repair apparatus 130 also includes an induction heating apparatus 132 for heating the HAZ 114 during the heat treating step. The induction heating apparatus 132 is placed adjacent and surrounding the disc 102 during this step. The induction heating apparatus 132 contains one or more induction heating coils (not shown) carrying a high-frequency (typically 10 kHz), high voltage signal that is inductively coupled to the disc 102. The inductive coupling induces an electric current in the disc that causes the disc to generate heat. The induction heating process produces a highly localized heating pattern that enables the temperature of various regions of the disc to be precisely controlled. The induction heating apparatus 132 may comprise several heating elements that are each positioned adjacent to a different region of the disc to maintain a different temperature in each region. In one embodiment of the apparatus, the induction heating apparatus 132 heats the HAZ 114 to the HAZ temperature $T_h$, the rim region 106 to the rim temperature $T_r$, and the bore region 108 to the bore temperature $T_b$, where $T_h$, $T_r > T_b$ (i.e., $T_h > T_r > T_b$ or $T_h = T_r > T_b$).

The repair apparatus 130 may also include a cooling apparatus 134 for cooling the bore region 108 to the bore temperature $T_b$, where $T_b$ is less than the HAZ temperature $T_h$. The cooling apparatus 134 may comprise any of the various cooling devices known in the art. The cooling apparatus may be placed on the shaft, away from the repaired disc and shaft heating apparatus to protect outboard bearings and other elements on the shaft. The cooling apparatus may also be positioned on the disc web area between the disc rim and the bore to cool this region and maintain a "negative" temperature differential between the disc bore and shaft.

Alternatively or in addition to the cooling apparatus 134, the repair apparatus 130 may include a shaft heating apparatus 136 for heating the shaft 104 to maintain a predetermined temperature differential between the bore region 108 and the shaft 104. The shaft heating apparatus 136 is placed adjacent to the shaft. The shaft heating apparatus 136 may comprise any of the various heating devices known in the art, including resistance or induction heating elements.

An alternate embodiment of the invention includes a modified heat treatment step. In particular, the bore region of the shaft and the disc may be heated together to a temperature above the original shrink-fit expansion temperature of the disc. In this case, the disc bore region and the shaft areas are heated to a temperature of approximately 800° F. The temperature of both areas is uniform, thus the original interference shrink fit dimensions are maintained. That is, the original interference fit is maintained provided that the heat is applied evenly to both the shaft and disc, while the disc rim is heated to a higher temperature (about 1200–1250° F.). Advantageously, this embodiment does not require cooling equipment.

In summary, the present invention is a method for repairing a shrink-fitted disc by depositing weld layers on the disc using a temperbead welding process and then heat treating the disc using an induction heating process. The combined use of the temperbead welding and induction heating processes by the present invention allows the disc to be adequately heat treated while preventing the relaxation of the disc's shrink-fitted forces and the bowing of the shaft. As a result, the present invention allows a disc to be repaired without removing the disc from the shaft.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A method of repairing a shrink-fitted turbine disc without removing said shrink-fitted turbine disc from a shaft, said method comprising the steps of:

depositing one or more weld layers in a vicinity of a defective region of said shrink-fitted turbine disc using a temperbead welding process; and heat treating said shrink-fitted turbine disc using an induction heating process to heat a heat-affected zone of said shrink-fitted turbine disc in a vicinity of said one or more weld layers to a temperature $T_h$, to heat a rim region of said shrink-fitted turbine disc to a temperature $T_r$, and to heat a bore region of said shrink-fitted turbine disc to a temperature $T_b$, where $T_h$, $T_r > T_b$.

2. The method of claim 1, wherein said depositing step comprises the following steps:

depositing a first weld layer; and depositing a second weld layer overlapping at least a portion of said first weld layer.

3. The method of claim 1, wherein said depositing step includes the step of using gas-tungsten arc welding.

4. The method of claim 1, wherein said depositing step includes the step of using laser welding.

5. The method of claim 1, wherein said depositing step includes the step of using submerged arc welding.

6. The method of claim 1, wherein during said heat treating step said temperature $T_r$ is less than a disc-tempering temperature and said temperature $T_b$ is less than a shrink-fit temperature.

7. The method of claim 1, wherein during said heat treating step said temperature $T_r$, is about 100 degrees Fahrenheit (° F.) below a disc-tempering temperature and said temperature $T_b$ is about 50 to 100° F. below a shrink-fit temperature.

8. The method of claim 1, wherein during said heat treating step said temperature $T_r$ is about 1250 degrees Fahrenheit (° F.) and said temperature $T_b$ is less than or equal to about 300° F.

9. The method of claim 1, wherein during said heat treating step the temperature of said shrink-fitted turbine disc varies approximately linearly across a diameter of said shrink-fitted turbine disc.

10. A method of repairing a shrink-fitted turbine disc without removing said shrink-fitted turbine disc from a shaft, said method comprising the steps of:

depositing one or more weld layers in a vicinity of a defective region of said shrink-fitted turbine disc using a temperbead welding process; and heat treating said shrink-fitted turbine disc including heating a heat-affected zone of said shrink-fitted turbine disc in a vicinity of said one or more weld layers using an induction heating process and concurrently cooling a bore region of said shrink-fitted turbine disc.

11. The method of claim 10, wherein said heat treating step further includes the step of maintaining a predetermined temperature differential between said bore region of said shrink-fitted turbine disc and said shaft.

12. The method of claim 11, wherein during said heat treating step said predetermined temperature differential between said bore region of said shrink-fitted turbine disc and said shaft is less than about 200° F.

13. A method of repairing a shrink-fitted turbine disc without removing said shrink-fitted turbine disc from a shaft, said method comprising the steps of:

depositing one or more weld layers in a vicinity of a defective region of said shrink-fitted turbine disc using a temperbead welding process; and heat treating said shrink-fitted turbine disc including heating at least a portion of said shrink-fitted turbine disc using an induction heating process and concurrently heating said shaft to maintain a predetermined temperature differential between a bore region of said shrink-fitted turbine disc and said shaft.

14. The method of claim 13, wherein during said heat treating step said predetermined temperature differential between said bore region of said shrink-fitted turbine disc and said shaft is less than about 200° F.

15. A method of repairing a shrink-fitted turbine disc without removing said shrink-fitted turbine disc from a shaft, said method comprising the steps of:

depositing one or more weld layers in a vicinity of a defective region of said shrink-fitted turbine disc using a temperbead welding process; and heat treating said shrink-fitted turbine disc including heating at least a portion of said shrink-fitted turbine disc using an induction heating process and concurrently heating said shaft to maintain a uniform temperature between a bore region of said shrink-fitted turbine disc and said shaft.

16. The method of claim 15, wherein during said heat treating step said uniform temperature between said bore region of said shrink-fitted turbine disc and said shaft is approximately 800° F.

* * * * *